United States Patent
Zhang et al.

(10) Patent No.: US 8,913,901 B2
(45) Date of Patent: Dec. 16, 2014

(54) SYSTEM AND METHOD FOR BLIND EQUALIZATION AND CARRIER PHASE RECOVERY IN A QUADRATURE AMPLITUDE MODULATED SYSTEM

(75) Inventors: Hongbin Zhang, Marlboro, NJ (US); Yu Sun, Lansdale, PA (US); Alexei N. Pilipetskii, Colts Neck, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 23 days.

(21) Appl. No.: 13/569,731

(22) Filed: Aug. 8, 2012

(65) Prior Publication Data

US 2013/0216239 A1    Aug. 22, 2013

Related U.S. Application Data

(60) Provisional application No. 61/600,991, filed on Feb. 20, 2012.

(51) Int. Cl.
| | | |
|---|---|---|
| *H04B 10/12* | (2006.01) | |
| *H04B 10/00* | (2013.01) | |
| *H04B 10/06* | (2006.01) | |
| *H03H 7/40* | (2006.01) | |
| *H03K 9/00* | (2006.01) | |
| *H04L 27/00* | (2006.01) | |
| *H04L 27/06* | (2006.01) | |
| *H04B 1/10* | (2006.01) | |

(52) U.S. Cl.
USPC ........... 398/208; 398/149; 398/159; 398/202; 398/205; 375/232; 375/316; 375/326; 375/340; 375/346; 375/350

(58) Field of Classification Search
CPC .. H04B 10/613; H04B 10/614; H04B 10/616; H04B 10/6971
USPC .......... 398/149, 159, 202, 205, 208; 375/232, 375/316, 326, 340, 346, 350
See application file for complete search history.

(56) References Cited

U.S. PATENT DOCUMENTS

| | | | |
|---|---|---|---|
| 6,252,903 B1 | 6/2001 | Werner et al. | |
| 6,337,878 B1 * | 1/2002 | Endres et al. | 375/229 |
| 6,668,014 B1 * | 12/2003 | Endres et al. | 375/232 |
| 7,031,405 B1 | 4/2006 | Touzni | |
| 7,315,575 B2 * | 1/2008 | Sun et al. | 375/229 |
| 8,335,440 B2 * | 12/2012 | Krause et al. | 398/208 |

(Continued)

FOREIGN PATENT DOCUMENTS

WO    97/30511 A1    8/1997

OTHER PUBLICATIONS

R.W. Lucky, Techniques for Adaptive Equalization of Digital Communication Systems, Feb. 1966, The Bell System Technical Journal.*

(Continued)

*Primary Examiner* — David Payne
*Assistant Examiner* — Pranesh Barua

(57) ABSTRACT

A system and method for blind equalization of a QAM signal. Equalization is achieved using an algorithm characterized by cost function that is a function the Euclidian distance, e.g. the minimum Euclidian distance, between points of the constellation associated with the QAM signal, i.e. the distance between symbols.

17 Claims, 7 Drawing Sheets

(56) References Cited

U.S. PATENT DOCUMENTS

| | | | | |
|---|---|---|---|---|
| 8,559,498 | B1* | 10/2013 | Eliaz | 375/233 |
| 2005/0019042 | A1* | 1/2005 | Kaneda et al. | 398/208 |
| 2007/0189374 | A1* | 8/2007 | Comparsi De Castro et al. | 375/232 |
| 2010/0061488 | A1* | 3/2010 | Endres et al. | 375/326 |
| 2011/0103795 | A1* | 5/2011 | Khandani et al. | 398/65 |
| 2011/0243575 | A1* | 10/2011 | Yan et al. | 398/205 |
| 2012/0134676 | A1* | 5/2012 | Kikuchi | 398/65 |
| 2012/0237204 | A1* | 9/2012 | Zhou | 398/25 |

OTHER PUBLICATIONS

Banovic K et al: "Computationally efficient methods for blind decision feedback equalization of QAM signals", AEU International Journal of Electronics and Communications, Elsevier, Jena, DE, vol. 62, No. 5, May 5, 2008, pp. 374-385.

Irshaad Fatadin et al: "Blind Equalization and Carrier Phase Recovery in a 16-QAM Optical Coherent System", Journal of Lightwave Technology, IEEE Service Center, New York, NY, US, vol. PP, No. 15, Aug. 1, 2009, pp. 3042-3049.

International Search Report issued in related application No. PCT/US2013/024752 dated Jun. 14, 2013.

Krzysztof Wesolowski; "Self-Recovering Adaptive Equalization Algorithms for Digital Radio and Voiceband Data Modems"; 1987; Institute of Electronics & Communications; Poland.

Jian Yang; "The Multimodulus Blind Equalization and Its Generalized Algorithms"; IEEE Journal on Selected Areas in Communications, vol. 20, No. 5, Jun. 2002; pp. 997-1015.

Zhang et al; "Square Modulus Algorithm for Blind Equalization and Carrier Phase Recovery in a 16-QAM Optical Coherent System"; 6 pgs.

Sato; "A Method of Self-Recovering Equalization for Multilevel Amplitude-Modulation Systems"; IEEE Transactions on Communications, Jun. 1975, pp. 679-682.

Benveniste; "Blind Equalizers"; IEEE Transactions on Communications, vol. COM-32, No. 8, Aug. 1984; pp. 871-883.

Godard; "Self-Recovering Equalization and Carrier Tracking in Two-Dimensional Data Communication Systems"; IEEE Transactions on Communications, vol. COM-28, No. 11; Nov. 1980; pp. 1867-1875.

* cited by examiner

SYSTEM AND METHOD FOR BLIND EQUALIZATION AND CARRIER PHASE RECOVERY IN A QUADRATURE AMPLITUDE MODULATED SYSTEM

CROSS-REFERENCE TO RELATED APPLICATIONS

This application claims the benefit of the filing date of U.S. Provisional Application Ser. No. 61/600,991 filed Feb. 20, 2012, the teachings of which are hereby incorporated herein by reference.

TECHNICAL FIELD

The present application relates to the optical transmission of information and, more particularly, to a system and method for blind equalization and carrier phase recovery in a quadrature amplitude modulated system.

BACKGROUND

In wavelength division multiplexed (WDM) optical communication systems, a number of different optical carrier wavelengths are separately modulated with data to produce modulated optical signals. The modulated optical signals are combined into an aggregate signal and transmitted over an optical transmission path to a receiver. The receiver detects and demodulates the data.

One type of modulation that may be used in optical communication systems is phase shift keying (PSK). According to different variations of PSK, data is transmitted by modulating the phase of an optical wavelength such that the phase or phase transition of the optical wavelength represents symbols encoding one or more bits. In a binary phase-shift keying (BPSK) modulation scheme, for example, two phases may be used to represent 1 bit per symbol. In a quadrature phase-shift keying (QPSK) modulation scheme, four phases may be used to encode 2 bits per symbol. Other phase shift keying formats include differential phase shift keying (DPSK) formats and variations of PSK and DPSK formats, such as return-to-zero DPSK (RZ-DPSK) and phase division multiplexed QPSK (PDM-QPSK).

A modulation format, such as QPSK wherein multiple data bits are be encoded on a single transmitted symbol may be generally referred to as a multi-level modulation format. Multi-level modulation techniques have been used, for example, to allow increased transmission rates and decreased channel spacing, thereby increasing the spectral efficiency (SE) of each channel in a WDM system. One spectrally efficient multi-level modulation format is quadrature amplitude modulation (QAM). In a QAM signal, information is modulated using a combination of PSK and amplitude shift keying (ASK), for example, to encode multiple bits per symbol. A 16QAM modulation format may be used, for example, to encode 4 bits per symbol. Certain PSK modulation schemes (e.g., BPSK and QPSK) may be referred to as a level of QAM (e.g., 2QAM and 4QAM respectively).

Polarization multiplexing (POLMUX) may be implemented with a modulation format to double the spectral efficiency of the format. In a POLMUX format, two relatively orthogonal states of polarization of the optical carrier are separately modulated with data, e.g. using a QAM modulation format, and then combined for transmission. For example, in a POLMUX-QAM signal, orthogonal polarizations of the same optical carrier are modulated with different data streams using a QAM modulation format.

During transmission of the modulated signals over the transmission path, non-linearities in the path may introduce transmission impairments, such as chromatic dispersion (CD), polarization mode dispersion (PMD) and polarization dependent loss (PDL), into the signals. At the receiver, coherent detection may be used to detect the modulated optical signals. Digital signal processing (DSP) may be applied to the outputs of the coherent receiver to de-multiplex polarization multiplexed signals, compensate for transmission impairments such as PMD, PDL and other residual impairments, and demodulate the data.

In general, the DSP in the receiver may be configured to recover the transmitted signal by filtering the received signal with an adaptive filter having the inverse transfer function of the transmission path. Such an adaptive filter may be referred to as an equalizer. An ideal equalizer recovers the signals passed through the transmission path and completely removes the impairments imparted by the transmission path.

The coefficients of the equalizer, also referred to herein as "tap weights", determine the transfer function of the equalizer. The tap weights are dynamically adjusted to minimize the error at the output of the equalizer. The error at the output of the equalizer is the difference between the actual output of the equalizer and the expected output. One way to acquire adjusted tap weights for the equalizer is to transmit a training sequence known by both the transmitter and receiver and to detect the impulse response of the transmission path from the training sequence. The receiver may then obtain the new tap weights by computing the inverse transfer function of the transmission path from the training sequence impulse response.

A second way to acquire adjusted tap weights for the equalizer is to start with initial values for the tap weights and design a cost function according to the characteristics of the received signal. The tap weights are continually adjusted by reducing the cost of the cost function until the error is minimized. When the error is minimized the equalizer is said to "converge." Equalizers implementing this second approach to acquiring adjusted tap weights are referred to as "blind equalizers." A blind equalizer is considered more effective than a non-blind equalizer since it continuously updates its transfer function to compensate for any changes in the transfer function of the transmission path without the need of synchronizing the training symbols.

A constant modulus algorithm (CMA) is one known algorithm used in blind-equalization. A CMA algorithm defines a cost function to estimate noise in a received signal. The higher the output (cost) of the cost function, the larger the noise and signal distortion in the received signal. The equalizer calculates an equalized signal by adding products of the received signal and the tap weights. After obtaining the equalized signal, the cost of the equalized signal is calculated using the cost function. The cost is used to adjust the tap weights of the equalizer. The equalizer then calculates a new equalized signal using the adjusted tap weights and obtains a new cost from the new equalized signal. The cost of the cost function is expected to be reduced by repeating this process.

A CMA is particularly useful in connection with PSK signals since it the equalized signal in a CMA converges on a constellation diagram with constellation points distributed over concentric circles. The CMA algorithm has been successfully implemented for POLMUX-QPSK signals for polarization demultiplexing and blind equalization. However, a CMA is not optimal for equalization of QAM signals since it produces a high mean square error (MSE) even when the equalizer is converged.

Several modifications to the CMA has been proposed, including a radius-directed decision-aided multimodulus algorithm (MMA), where a decision is made as to the ring of a constellation that a received symbol most likely belongs to and then the ring radius is adjusted. An example of an MMA is described in *The Multimodulus Blind Equalization and Its Generalized Algorithms* by Yang et al., published in IEEE Journal on Selected Areas in Communications, vol., No. 5, pp 997-1015, June 2002. One drawback of this type of MMA is that it relies on correct decisions of the ring radius. Also, the ring spacing in a 16 QAM signal, for example, can be smaller than the minimum symbol spacing. Accordingly, this type of MMA can produce large errors for low signal-to-noise ratio (SNR) and/or severe signal distortions.

Another challenge associated with known CMA and MMA equalizers is that they are insensitive to the carrier phase of the received optical signal. As such, an estimation of the carrier phase of the received signal is required when using CMA and MMA equalizers to ensure reliable demodulation of the data. A variety of approaches have been developed for performing carrier phase estimation (CPE) in the DSP of a receiver. These approaches are, however, complex and utilize the computing resources of the DSP.

BRIEF DESCRIPTION OF THE DRAWINGS

Reference should be made to the following detailed description which should be read in conjunction with the following figures, wherein like numerals represent like parts.

DETAILED DESCRIPTION

In general, a system consistent with the present disclosure implements an algorithm that achieves high-performance blind equalization of a QAM signal without requiring separate carrier phase estimation (CPE). An algorithm consistent with the present disclosure may be referred to as a square modulus algorithm (SMA) and calculates a cost function that is a function the Euclidian distance, e.g. the minimum Euclidian distance, between points of the constellation associated with the QAM signal, i.e. the distance between symbols.

Figure 1:
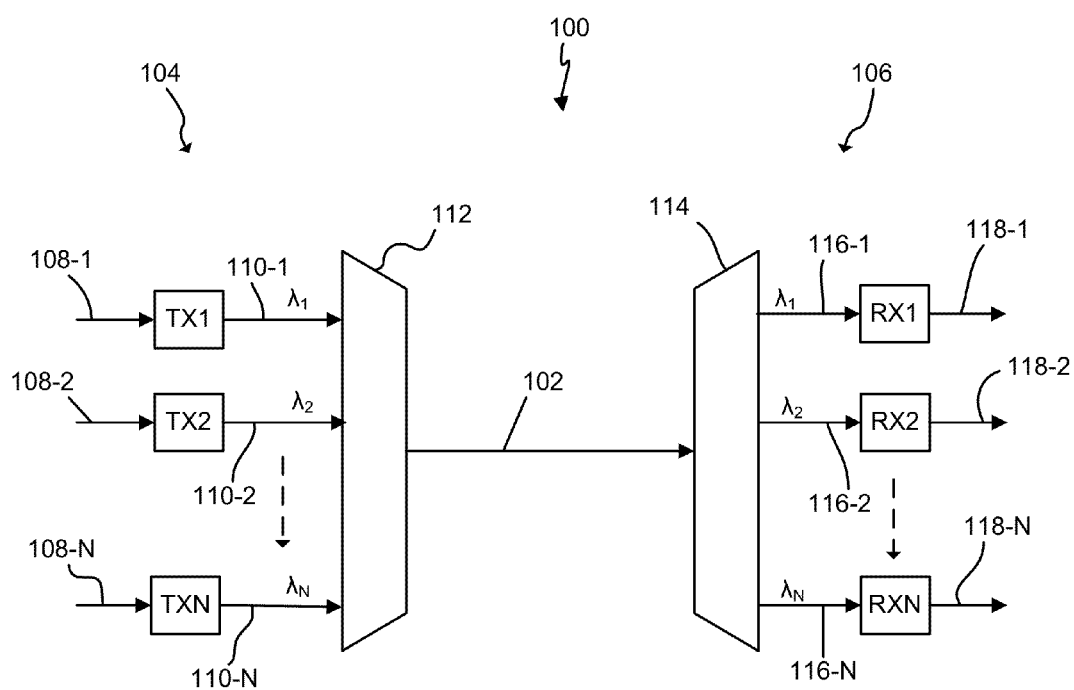
FIG. 1 is a block diagram of one exemplary embodiment of a system consistent with the present disclosure.

FIG. 1 is a simplified block diagram of one exemplary embodiment of a WDM transmission system 100 consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system and are useful in connection with a long-haul WDM optical system, the broad concepts discussed herein may be implemented in other communication systems transmitting and receiving other types of signals.

Those skilled in the art will recognize that the system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXN receives a data signal on an associated input port 108-1, 108-2 . . . 108-N, and transmits the data signal on associated wavelength $\lambda_1, \lambda_2 \ldots \lambda_N$. One or more of the transmitters TX1, TX2 . . . TXN may be configured to modulate data on the associated wavelength with using a QAM modulation format, such as POLMUX-QAM. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-N. The data channels are combined into an aggregate signal on optical path 102 by a multiplexer or combiner 112. The optical information path 102 may include optical fiber waveguides, optical amplifiers, optical filters, dispersion compensating modules, and other active and passive components.

The aggregate signal may be received at one or more remote receiving terminals 106. A demultiplexer 114 separates the transmitted channels at wavelengths $\lambda_1, \lambda_2 \ldots \lambda_N$ onto associated paths 116-1, 116-2 . . . 116-N coupled to associated receivers RX1, RX2 . . . RXN. One or more of the receivers RX1, RX2 . . . RXN may be configured to demodulate the transmitted signal and provide an associated output data signal on an associated output path 118-1, 118-2, 118-3, 118-N.

Figure 2:
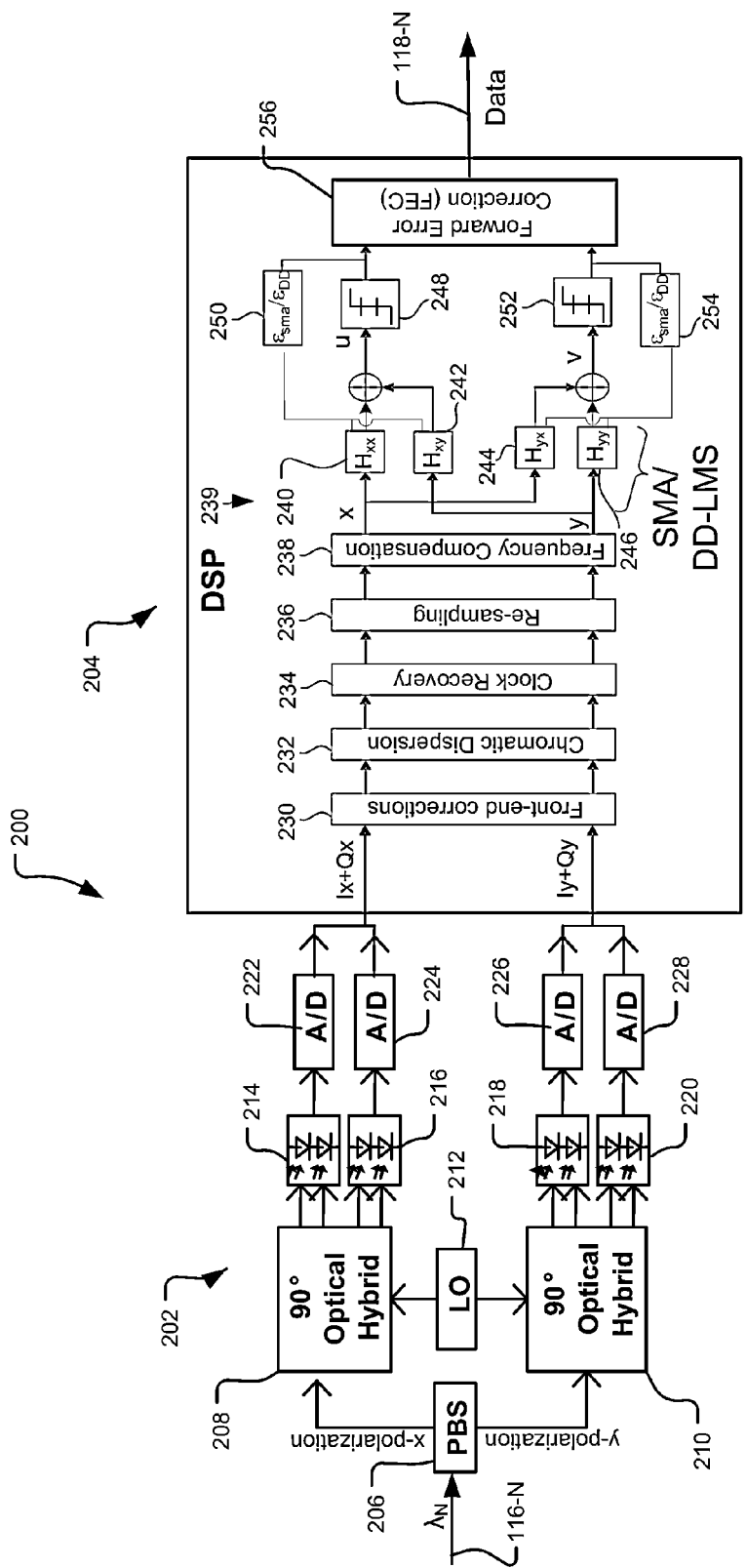
FIG. 2 is a block diagram of one exemplary embodiment of a receiver consistent with the present disclosure.

FIG. 2 is a simplified block diagram of one exemplary receiver 200 consistent with the present disclosure. The illustrated exemplary embodiment 200 includes a polarization-diversity coherent receiver configuration 202 for receiving an input signal on path 116-N and a digital signal processing (DSP) circuit 204 for processing the output of the coherent receiver to provide an output data signal on path 118-N. Data is modulated on the carrier wavelength $\lambda_N$ of the optical input signal according to a POLMUX-QAM modulation format. The coherent receiver 202 converts the received optical input signal into one or more digital signals that are coupled as inputs to the DSP circuit 204. The DSP circuit 204 demodulates the data from the digital signals to provide an output data stream on path 118-N representative of the data modulated on the carrier wavelength $\lambda_N$.

The coherent receiver 202 may take a variety of configurations. In the illustrated exemplary embodiment, the receiver includes a polarization beam splitter (PBS) 206, first and second 90° optical hybrids 208, 210, a local oscillator (LO) 212, balanced detectors 214, 216, 218, 220 and analog-to-digital (A/D) converters 222, 224, 226, 228. The operations of these components in a coherent optical signal receiver are briefly described as follows. In general, orthogonal x- and y-polarizations of the input optical signal are split onto separate paths by the PBS 206. Each polarization is coupled to an associated 90° optical hybrid 208, 210. Each optical hybrid mixes its input signal with the four quadrilateral states of the LO oscillator signal in the complex-field space. Each optical hybrid then delivers the four mixed signals to two pairs of balanced detectors 214, 216, 218, 220. The outputs of the balanced detectors are converted to digital signals by the A/D converters 222, 224, 226, 228. The outputs of the A/D converters 222 and 224 may be designated as the I and Q outputs, respectively, for the x-polarization (i.e. Ix, Qx in FIG. 2), and the outputs of the A/D converters 226 and 228 may be designated as the I and Q outputs, respectively, for the y-polarization (i.e. Iy, Qy in FIG. 2)

The digital outputs of the A/D converters are coupled as inputs to the DSP circuit 204. In general, DSP involves processing of signals using one or more application specific integrated circuits (ASICS) and/or special purpose processors configured for performing specific instruction sequences, e.g. directly and/or under the control of software instructions. In the illustrated exemplary embodiment, the DSP circuit 204 is shown as including a front-end corrections function 230, a chromatic dispersion compensation function 232, a clock recovery function 234, a re-sampling function 236, a frequency compensation function 238, a SMA/DD-LMS equalizer function 239, and a forward error correction (FEC) function 256. These functions may be implemented in a variety of configurations using any combination of hardware, software and/or firmware and, although a specific order is shown, the functions can be executed in a different order. Although the functions are illustrated separately, it is to be understood that any one or more of the functions may be performed in a single integrated circuit or processor, or in a combination of integrated circuits and/or processors. Also, the integrated circuits and/or processors implementing the DSP functions may be shared among the illustrated functions in whole or in part.

The front-end corrections function 230 receives the outputs Ix, Qx and Iy, Qy of the A/D converters 222, 224, 226, 228. In a known manner, the front-end corrections function 230 removes skew between I and Q channels and any DC offset of all the waveforms. The front-end corrections function 230 provides a single output for the x-polarization and a single output for the y-polarization, as shown. The chromatic dispersion compensation function 232 receives the outputs of the front end corrections function 230. In a known manner, the chromatic dispersion function 232 may compensate for effects of chromatic dispersion imparted to the input signal. The chromatic dispersion function 232 may be implemented, for example, as a two distinct finite impulse response (FIR) filters, one of which performs compensation for the x-polarization and the other of which performs compensation on the y-polarization. The clock recovery function 234 receives the outputs of the chromatic dispersion function 232 and in a known manner recovers the data clock therefrom. The re-sampling function 236 receives the outputs of the clock recovery function 234 and in a known manner re-samples the data at the x and y polarizations at a higher rate, e.g. twice or four times the number of samples per symbol. The frequency compensation function 238 receives the outputs of the re-sampling function 236 and in a known manner compensates for any difference between the frequency of the local oscillator 212 and the frequency of the received signal. The frequency compensation function 238 provides a single output for the x-polarization (x in FIG. 2) and a single output for the y-polarization (y in FIG. 2), as shown.

As will be discussed in greater detail, the SMA/DD-LMS equalizer function 239 receives the compensated outputs x and y from the frequency compensation function 238, and applies an algorithm consistent with the present disclosure (i.e. a SMA) for performing blind-equalization of the x and y outputs and to provide separate outputs u and v without the need for a carrier phase estimation function in the DSP circuit 204. The output u corresponds to the first polarization on which data was modulated at the transmitter, and the output v corresponds to the second polarization, orthogonal the first polarization, on which data was modulated at the transmitter. These outputs are supplied as inputs to the forward error correction function 256.

The forward error correction (FEC) function 256 may include a known function for decoding an FEC code applied to the data at the transmitter. The output of the forward error correction function 256 may thus be representative of the data modulated on the both polarizations of carrier wavelength $\lambda_N$ and may be coupled on an output on path 118-N.

As shown, the SMA/DD-LMS equalizer function 239 includes sub-equalizers, 240, 242, 244, 246. In the illustrated embodiment, sub-equalizers 240 and 244 each receive as an input the x-output of the frequency compensation function 238 that corresponds to the x-polarization. Sub-equalizers 242 and 246 each receive as an input the y-output of the frequency compensation function 238 that corresponds to the y-polarization. The sub-equalizers 240, 242, 244, and 246 have transfer functions, $H_{xx}$, $H_{xy}$, $H_{yx}$ and $H_{yy}$, respectively.

Figure 3:
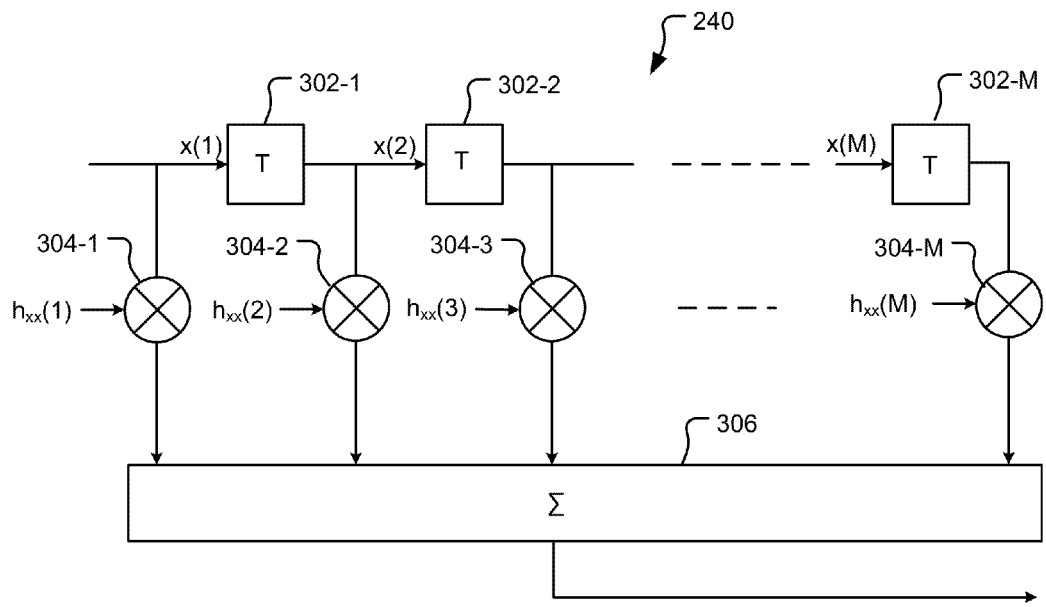
FIG. 3 is a block diagram of an exemplary embodiment of the $H_{xx}$ sub-equalizer shown in FIG. 2.

FIG. 3 is a block diagram illustrating one embodiment of a sub-equalizer 240 having transfer function $H_{xx}$. As shown, sub-equalizer 240 is a tapped delay equalizer, where M is the number of taps. The sub-equalizer includes delays 302 including delays 302-1, 302-2 . . . 302-M, multipliers 304 including multipliers 304-1, 304-2, 304-3 . . . 304-M, and a summer 306. The input signal to the sub-equalizer 240 is the output from the frequency compensation function 238 corresponding to the x-polarization. Each of the multipliers 304-1, 304-2, 304-3 . . . 304-M receives a respective filter coefficient (tap weight) $h_{xx}(k)$, k=1 to M from a memory (not shown) and multiplies the filter coefficient by the value received from either the input signal or the associated one of the delays, as shown. The resulting tap weight products are summed by the summer 306 and the result is supplied as the output of the sub-equalizer 240. The output is provided continuously with the values of $h_{xx}(k)$ being updated as will be described below.

Figure 4:
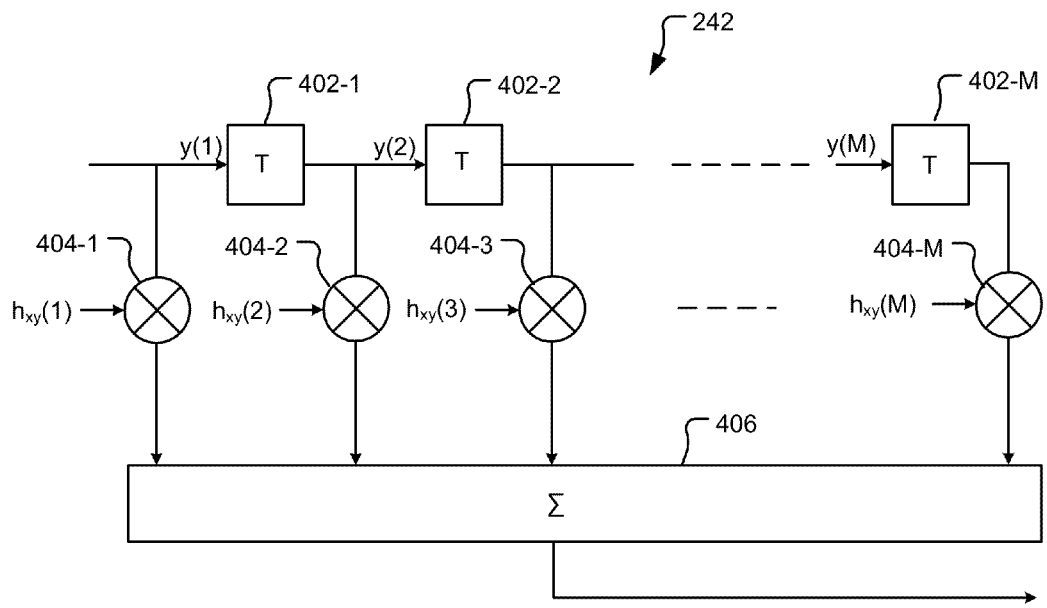
FIG. 4 is a block diagram of an exemplary embodiment of the $H_{xy}$ sub-equalizer shown in FIG. 2.

FIG. 4 is a block diagram illustrating one embodiment of a sub-equalizer 242 having transfer function $H_{xy}$ in frequency domain or $h_{xy}(k)$, k=1 to M in time domain. As shown, sub-equalizer 242 is a tapped delay equalizer, where M is the number of taps. The sub-equalizer includes delays 402 including delays 402-1, 402-2 . . . 402-M, multipliers 404 including multipliers 404-1, 404-2, 404-3 . . . 404-M, and a summer 406. The input signal to the sub-equalizer 242 is the output from the frequency compensation function 238 corresponding to the y-polarization. Each of the multipliers 404-1, 404-2, 404-3 . . . 404-M receives a respective filter coefficient (tap weight) $h_{xy}(k)$, k=1 to M from a memory (not shown) and multiplies the filter coefficient by the value received from either the input signal or the associated one of the delays, as shown. The resulting tap weight products are summed by the summer 406 and the result is supplied as the output of the sub-equalizer 242. The output is provided continuously with the values of $h_{xy}(k)$ being updated as will be described below.

Figure 5:
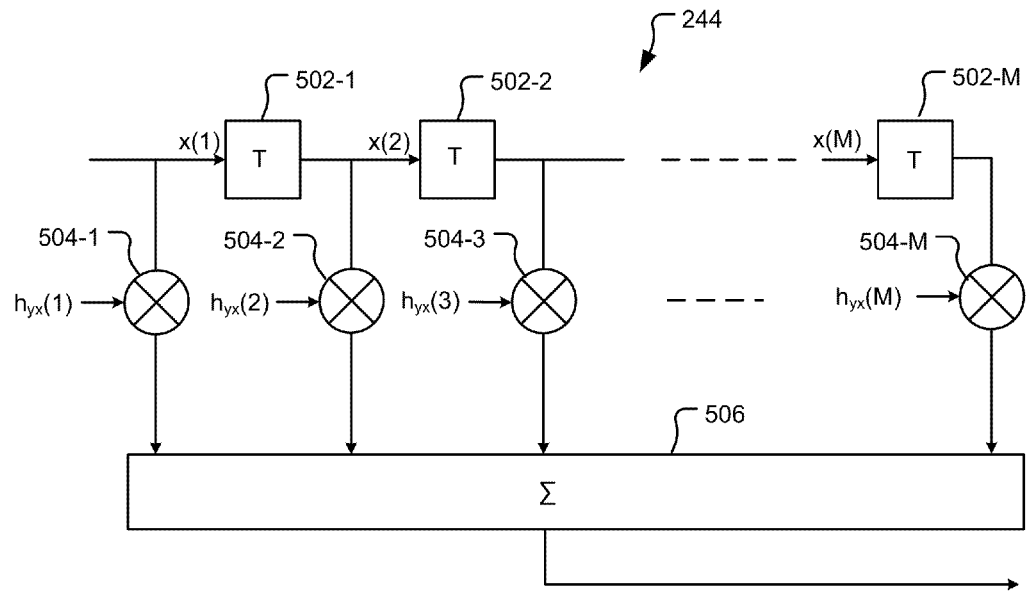
FIG. 5 is a block diagram of an exemplary embodiment of the $H_{yx}$ sub-equalizer shown in FIG. 2.

FIG. 5 is a block diagram illustrating one embodiment of a sub-equalizer 244 having transfer function $H_{yx}$. As shown, sub-equalizer 244 is a tapped delay equalizer, where M is the number of taps. The sub-equalizer includes delays 502 including delays 502-1, 502-2 . . . 502-M, multipliers 504 including multipliers 504-1, 504-2, 504-3 . . . 504-M, and a summer 506. The input signal to the sub-equalizer 244 is the output from the frequency compensation function 238 corresponding to the x-polarization. Each of the multipliers 504-1, 504-2, 504-3 . . . 504-M receives a respective filter coefficient (tap weight) $h_{yx}(k)$, k=1 to M from a memory (not shown) and multiplies the filter coefficient by the value received from either the input signal or the associated one of the delays, as shown. The resulting tap weight products are summed by the summer 506 and the result is supplied as the output of the sub-equalizer 244. The output is provided continuously with the values of $h_{yx}(k)$ being updated as will be described below.

Figure 6:
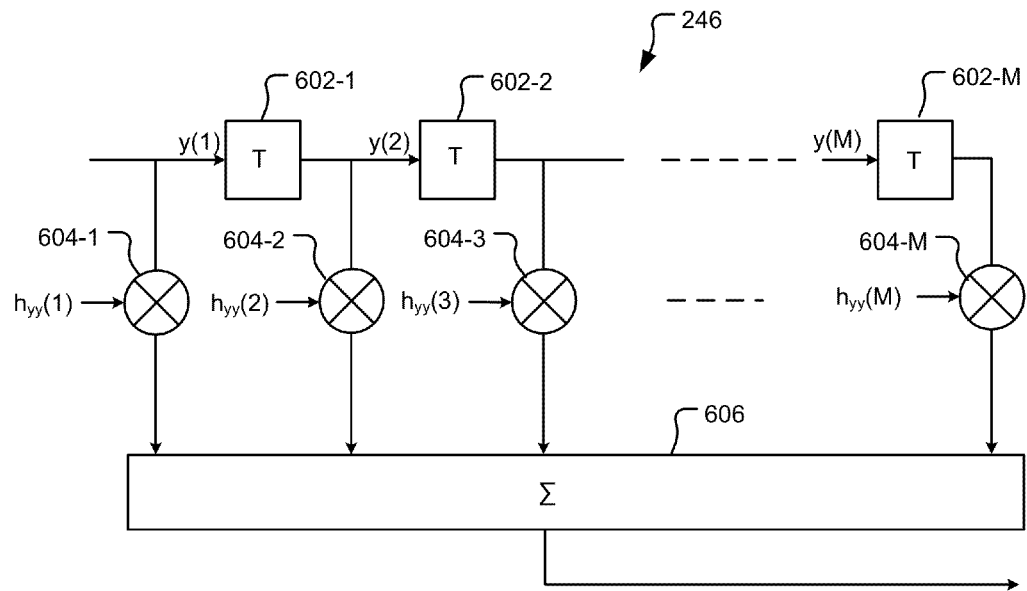
FIG. 6 is a block diagram of an exemplary embodiment of the $H_{yy}$ sub-equalizer shown in FIG. 2.

FIG. 6 is a block diagram illustrating one embodiment of a sub-equalizer 246 having transfer function $H_{yy}$. As shown, sub-equalizer 246 is a tapped delay equalizer, where M is the number of taps. The sub-equalizer includes delays 602 including delays 602-1, 602-2 . . . 602-M, multipliers 604 including multipliers 604-1, 604-2, 604-3 . . . 604-M, and a summer 606. The input signal to the sub-equalizer 246 is the output from the frequency compensation function 238 corresponding to the y-polarization. Each of the multipliers 604-1, 604-2, 604-3 . . . 604-M receives a respective filter coefficient (tap weight) $h_{yy}(k)$, k=1 to M from a memory (not shown) and multiplies the filter coefficient by the value received from either the input signal or the associated one of the delays, as shown. The resulting tap weight products are summed by the summer 606 and the result is supplied as the output of the sub-equalizer 246. The output is provided continuously with the values of $h_{yy}(k)$ being updated as will be described below.

As shown, the outputs u and v of the SMA/DD-LMS equalizer function 239, for any symbol n, are provided as:

$$u(n)=h_{xx}(n)x(n)+h_{xy}(n)y(n)$$

$$v(n)=h_{yx}(n)x(n)+h_{yy}(n)y(n) \quad (1)$$

where $h_{xx}(n)$, $h_{xy}(n)$, $h_{yx}(n)$ and $h_{yy}(n)$ and are 1×M row vectors for any symbol n and x(n) and y(n) are M×1 column vector of the input signals for any symbol n. The output u is coupled to a known slicer configuration 248 for providing a hard decision as to value of each output u(k) in a known manner, and the output v is coupled to a known slicer configuration 252 for providing a hard decision value of each output v(k) in a known manner. Each of the outputs u and v has an associated error signal function 250, 254 that calculates error signals $\epsilon_{sma}$ and $\epsilon_{DD}$ in response to the output of the equalizers and the output of the associated slicer 248, 252 and feeds the error signal back to the equalizers 240, 242 and 244, 246, respectively. The filter coefficients of the sub-equalizers 240, 242, 244, 246 are updated in response to the error signal $\epsilon_{sma}$ or $\epsilon_{DD}$. Calculation of the error signals and updating of the filter coefficients based on the error signals is described in greater detail below.

In the illustrated embodiment, the SMA/DD-LMS function 239 operates using a SMA algorithm consistent with the present disclosure by updating filter coefficients of the sub-equalizers 240, 242, 244, 246 using the error signal $\epsilon_{sma}$ until the SMA algorithm converges. Once the SMA algorithm converges, the SMA/DD-LMS function 239 switches to operation using a known decision-directed least mean square (DD-LMS) algorithm. In the DD-LMS algorithm filter coefficients of the sub-equalizers 240, 242, 244, 246 are updated using the error signal $\epsilon_{DD}$ until the DD-LMS algorithm converges. The combined use of a SMA algorithm consistent with the present disclosure and a known DD-LMS algorithm provides high performance and reliability.

In a system and method consistent with the present disclosure, the filter coefficients of the sub-equalizers, 240, 242, 244 and 246 are calculated using a SMA algorithm having a cost function that is a function the Euclidian distance, e.g. the minimum Euclidian distance, between points of the constellation associated with the equalized QAM signal, i.e. the distance between symbols. For example, the cost function of a SMA algorithm consistent with the present disclosure may be:

$$J_X=E[(D^2-|R^2-|Re(u(n))|^2|)^2]+E[(D^2-|R^2|Im(u(n))|^2|)^2]$$

$$J_Y=E[(D^2-|R^2-|Re(v(n))|^2|)^2]+E[(D^2-|R^2|Im(v(n))|^2|)^2] \quad (2)$$

where $J_X$ and $J_Y$ represent the cost function value for both X and Y polarization tributaries, respectively, E[.] denotes expectation, D is the minimum Euclidian distance between points of the signal constellation at the output of the equalizer, $R^2$ is equal to ½ of the average symbol power at the output of the equalizer, Re(u(n)) and Re(v(n)) is the real portion of the output signal for the current update cycle, and Im(u(n)) and Im(v(n)) is the imaginary portion of the output signal for the current update cycle.

Figure 7:
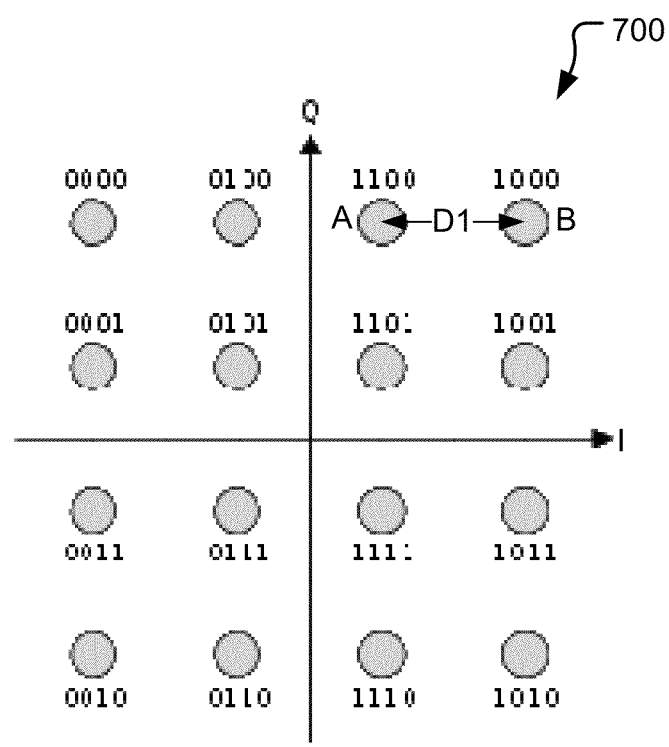
FIG. 7 is a constellation diagram of an exemplary 16QAM signal illustrating a Euclidian distance between symbols.

By way of illustration only, FIG. 7 is a constellation diagram 700 (in-phase (I) vs. quadrature (Q)) of one example of a 16QAM signal. The illustrated constellation includes 16 constellation points, each of which is assigned a 4-bit code or value. The minimum Euclidean distance between the constellation points labeled A and B, for example, may be the distance D1. Although FIG. 7 is a constellation diagram for a 16QAM signal, it is to be understood a system or method consistent with the present disclosure is not limited to use of 16QAM signals.

In the specific example shown in FIG. 2, a SMA algorithm implemented by the SMA/DD-LMS function 239 may converge by calculating the filter coefficients as:

$$h_{xx}(n+1)=h_{xx}(n)+\mu\epsilon_{SMA}(u(n))u(n)x^*(n)$$

$$h_{xy}(n+1)=h_{xy}(n)+\mu\epsilon_{SMA}(u(n))u(n)y^*(n)$$

$$h_{yy}(n+1)=h_{yy}(n)+\mu\epsilon_{SMA}(v(n))v(n)y^*(n)$$

$$h_{yx}(n+1)=h_{yx}(n)+\mu\epsilon_{SMA}(v(n))v(n)x^*(n) \quad (3)$$

where n is the current update cycle, n+1 is the next update cycle, μ is the step size (e.g. 10-3), u(n) is the output signal u for the current update cycle, v(n) is the output signal v for the current update cycle, and x(n) is the input signal x for the current updated cycle, y(n) is the input signal y for the current update cycle, the superscript * means complex conjugation, and $\epsilon_{sma}(u(n))$ $\epsilon_{sma}(v(n))$ are calculated by the error signal functions 250 and 254, respectively, as:

$$\epsilon_{SMA}(u(n))=(D^2-|R^2-|Re(u(n))|^2|)+j(D^2-|R^2-|Im(u(n))|^2|)$$

$$\epsilon_{SMA}(v(n))=(D^2-|R^2-|Re(v(n))|^2|)+j(D^2-|R^2-|Im(v(n))|^2|) \quad (4)$$

where D is the minimum Euclidian distance between symbols at the output of the respective slicer 248, 252, $R^2$ is equal to ½ of the average symbol power at the output of the respective slicer 248, 252, Re denotes the real portion of a signal, and Im denotes the imaginary portion a signal.

Once the SMA algorithm converges, the SMA/DD-LMS function 239 switches to operation using a known decision-directed least mean square (DD-LMS) algorithm. In the DD-LMS algorithm filter coefficients are calculated as:

$$h_{xx}(n+1) = h_{xx}(n) + \mu \epsilon_{DD}(u(n))x^*(n)$$

$$h_{xy}(n+1) = h_{xy}(n) + \mu \epsilon_{DD}(u(n))y^*(n)$$

$$h_{yy}(n+1) = h_{yy}(n) + \mu \epsilon_{DD}(v(n))y^*(n)$$

$$h_{yx}(n+1) = h_{yx}(n) + \mu \epsilon_{DD}(v(n))x^*(n) \quad (5)$$

where n is the current update cycle, n+1 is the next update cycle, 1.1 is the step size (e.g. 10-3), u(n) is the output signal u for the current update cycle, v(n) is the output signal v for the current update cycle, and x(n) is the input signal x for the current updated cycle, y(n) is the input signal y for the current update cycle, the superscript * means complex conjugation, and $\epsilon_{DD}(u(n))$ $\epsilon_{DD}(v(n))$ are calculated by the error signal functions 250 and 254, respectively, as:

$$\epsilon_{DD}(u(n)) = \Gamma(u(n)) - u(n)$$

$$\epsilon_{DD}(v(n)) = \Gamma(v(n)) - v(n) \quad (6)$$

where Γ denotes the decision function.

Figure 8:
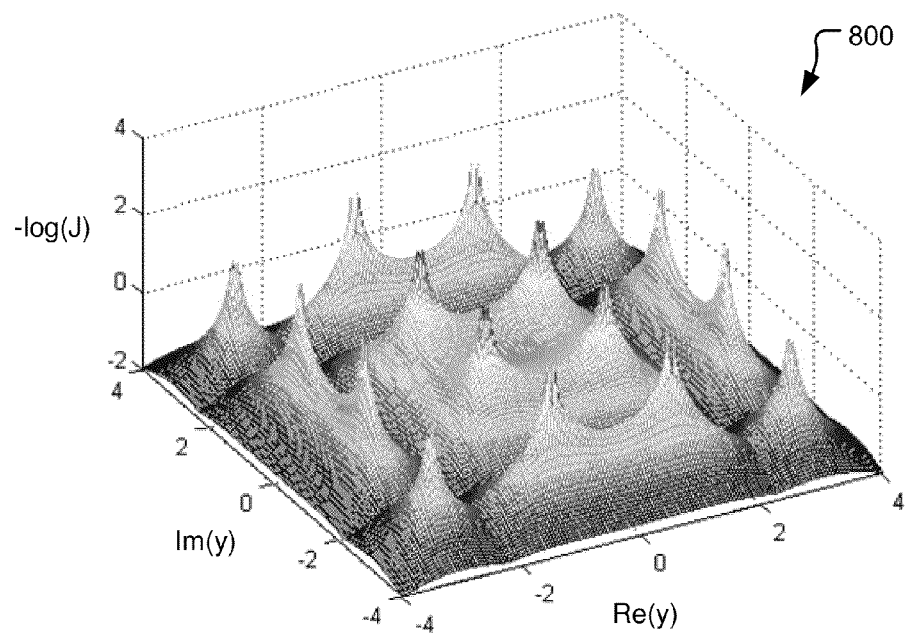
FIG. 8 is a plot of the negative of the cost function ($-\log(J)$) of an algorithm consistent with the present disclosure vs. real ($\text{Re}(y)$) and imaginary ($\text{Im}(y)$) components of an equalized signal.
Figure 9:
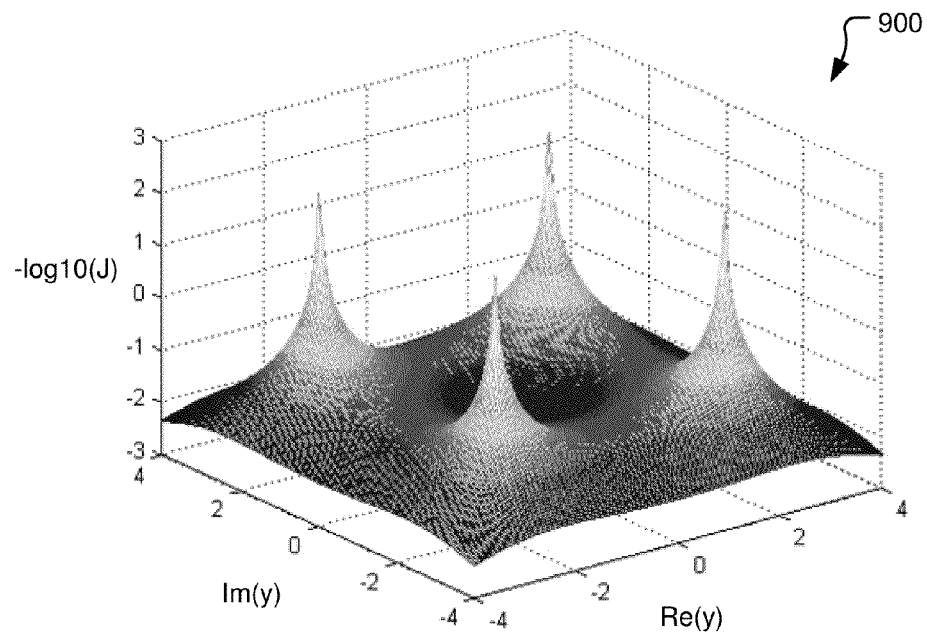
FIG. 9 is a plot of the negative of the cost function ($-\log(J)$) of a prior art MMA vs. real ($\text{Re}(y)$) and imaginary ($\text{Im}(y)$) components of an equalized signal.

Advantageously, system implementing a SMA algorithm consistent with the present disclosure achieves high-performance blind equalization of a QAM signal without requiring separate carrier phase estimation (CPE). FIG. 8 for example is a plot 800 of the negative of the cost function (−log(J)) of a SMA consistent with the present disclosure vs. real (Re(y)) and imaginary (Im(y)) components of an equalized signal that was modulated using a 16QAM modulation format. As shown, a SMA consistent with the present disclosure converges to the constellation of a 16QAM signal. For comparison, FIG. 9 is a plot 900 of the negative of the cost function (−log(J)) of a prior art MMA vs. real (Re(y)) and imaginary (Im(y)) components of an equalized signal that was modulated using a 16QAM modulation format. As shown, the prior art MMA does not converge to a 16QAM signal.

Figures 10, 11:
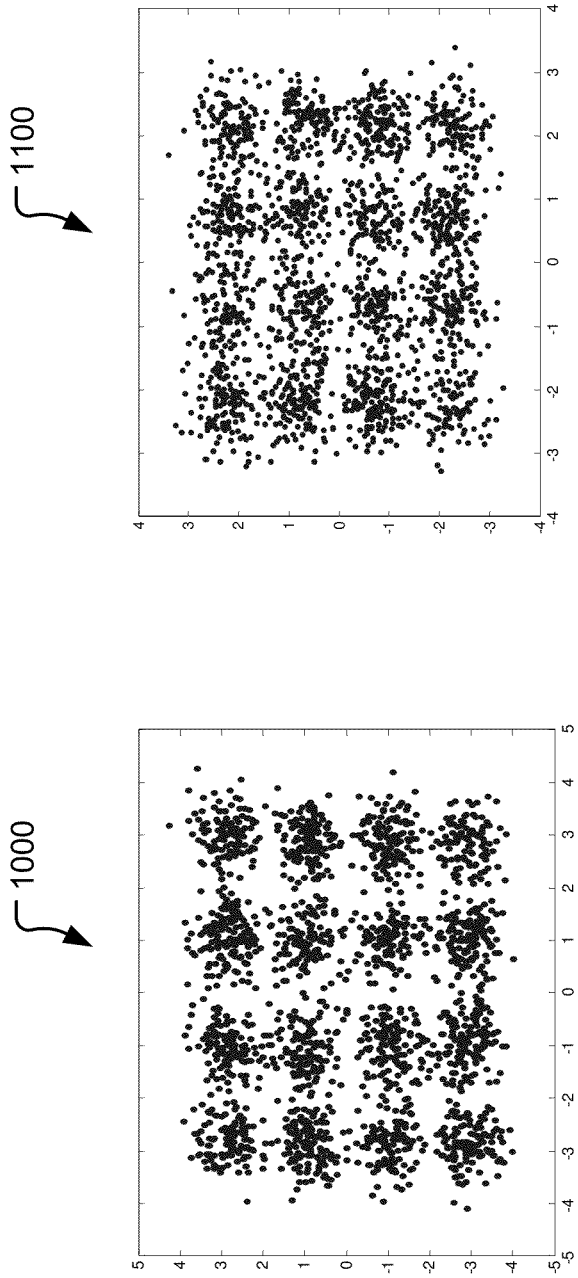
FIG. 10 is a constellation diagram illustrating performance of a system using an algorithm consistent with the present disclosure.
FIG. 11 is a constellation diagram illustrating performance of a system using a prior art MMA algorithm.

FIG. 10 is a constellation diagram 1000 of a 16QAM-modulated signal equalized using a SMA consistent with the present disclosure, and FIG. 11 is a constellation diagram 1100 of the 16QAM-modulated signal equalized using a prior art MMA. As shown, the SMA constellation diagram of FIG. 10 more closely converges to a 16QAM signal than the MMA constellation of FIG. 11. The Q performance associated with the constellation diagram in FIG. 10 was about 7.76 dB, while the Q performance associated with the constellation diagram in FIG. 11 was about 3.09 dB. This high performance can be achieved using a SMA consistent with the present disclosure, and without use of carrier phase estimation in the DSP 204.

According to one aspect of the disclosure there is provided an optical receiver system including: a digital signal processor (DSP) including an equalizer configured to equalize a signal representative of a quadrature amplitude modulated (QAM) optical signal transmitted over an optical transmission path. The equalizer is configured to equalize the signal by application of an equalization algorithm to the signal. The equalization algorithm is characterized by a cost function that is a function of a Euclidian distance between detected symbols of the QAM optical signal at an output of the equalizer.

According to another aspect of the disclosure there is provided an optical receiver system including: a coherent receiver for receiving a polarization multiplexed quadrature amplitude modulated (QAM) optical signal and providing a first plurality of outputs in response to a first polarization of the optical signal and a second plurality of outputs in response to a second polarization of the optical signal; and a digital signal processor (DSP) including an equalizer configured apply an equalization algorithm to a first digital signal established in response to the first plurality of outputs and a second digital signal established in response to the second plurality of outputs to provide first and second digital outputs representative of a first polarization state of the QAM optical signal at which data is modulated and a second polarization state of the QAM optical signal at which data is modulated. The equalization algorithm is characterized by a cost function that is a function of a Euclidian distance between detected symbols of the QAM optical signal in the first digital output of the equalizer.

According to another aspect of the disclosure there is provided a method of demodulating a quadrature amplitude modulated (QAM) optical signal using a digital signal processor (DSP) without a carrier phase estimation function for estimating a carrier phase of the QAM signal. The method includes equalizing a signal representative of the (QAM) optical signal transmitted over an optical transmission path using an equalizer configured to apply equalization algorithm to the signal, the equalization algorithm being characterized by a cost function that is a function of a Euclidian distance between detected symbols of the QAM optical signal at an output of the equalizer.

Embodiments of the methods described herein may be implemented using a processor and/or other programmable device, such as the DSP 204. To that end, the methods described herein may be implemented on a tangible, non-transitory computer readable medium having instructions stored thereon that when executed by one or more processors perform the methods. Thus, for example, the DSP 204 may include a storage medium (not shown) to store instructions (in, for example, firmware or software) to perform the operations described herein. The storage medium may include any type of tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, "circuitry" may comprise, for example, singly or in any combination, hardwired circuitry, programmable circuitry, state machine circuitry, and/or firmware that stores instructions executed by programmable circuitry. In at least one embodiment, the DSP 204 may comprise one or more integrated circuits. An "integrated circuit" may be a digital, analog or mixed-signal semiconductor device and/or microelectronic device, such as, for example, but not limited to, a semiconductor integrated circuit chip.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical receiver system comprising:
  a digital signal processor (DSP) comprising an equalizer configured to equalize a signal representative of a quadrature amplitude modulated (QAM) optical signal transmitted over an optical transmission path,
  said equalizer being configured to equalize said signal by application of an equalization algorithm to said signal, said equalization algorithm being characterized by a cost function,
  said cost function being a function of a Euclidian distance between detected symbols of said QAM optical signal at an output of said equalizer, wherein said cost function is:

$$J=E[(D^2-|R^2-|Re(u(n))|^2|)^2]+E[(D^2-|R^2|Im(u(n))|^2|)^2]$$

where J represents the cost function value E[.] denotes expectation, D is said Euclidian distance and is a minimum Euclidian distance between said symbols, $R^2$ is equal to ½ of the average symbol power at said output of said equalizer, $Re(u(n))$ is a real portion of said output of said equalizer for a current update cycle, and $Im(u(n))$ is an imaginary portion of said output of said equalizer for said current update cycle.

2. An optical receiver system according to claim 1, wherein said Euclidean distance is a minimum Euclidian distance between said detected symbols.

3. An optical receiver system according to claim 1, wherein said DSP does not include a carrier phase estimation function for estimating a carrier phase of said QAM signal.

4. An optical receiver system according to claim 1, said system further comprising a coherent receiver for receiving said QAM optical signal, and wherein said signal representative of said QAM signal is provided as an output of said coherent receiver coupled to said equalizer through at least one DSP function.

5. An optical receiver system according to claim 1, wherein QAM optical signal is a polarization multiplexed QAM optical signal.

6. An optical receiver system according to claim 1, wherein said equalizer comprises at least one sub-equalizer filter, said at least one sub-equalizer filter comprising a plurality of delays for producing successively delayed versions of said signal and a plurality of multipliers, each of said multipliers multiplying said signal or an associated one of said delayed versions of said signal with an associated filter coefficient to produce an associated tap weight product, said tap weight products being summed to provide said output of said equalizer.

7. An optical receiver system according to claim 1, wherein said equalizer comprises at least one sub-equalizer filter, said at least one sub-equalizer filter comprising a plurality of delays for producing successively delayed versions of said signal and a plurality of multipliers, each of said multipliers multiplying said signal or an associated one of said delayed versions of said signal with an associated filter coefficient to produce an associated tap weight product, said tap weight products being summed to provide said output of said equalizer.

8. An optical receiver system according to claim 7, wherein said filter coefficients for said at least one sub-equalizer are calculated according to the following equation:

$$h_{xx}(n+1)=h_{xx}(n)+\mu\epsilon_{SMA}(u(n))u(n)x^*(n)$$

where n is said current update cycle, n+1 is a next update cycle, μ is a step size, x(n) is said signal for said current update cycle, the superscript * means complex conjugation, and εsma(u(n)) is calculated as:

$$\epsilon_{SMA}(u(n))=(D^2-|R^2-|Re(u(n))|^2|)+j(D^2-|R^2-|Im(u(n))|^2|).$$

9. An optical receiver system comprising:
  a coherent receiver for receiving a polarization multiplexed quadrature amplitude modulated (QAM) optical signal and providing a first plurality of outputs in response to a first polarization of said optical signal and a second plurality of outputs in response to a second polarization of said optical signal; and
  a digital signal processor (DSP) comprising an equalizer configured apply an equalization algorithm to a first digital signal established in response to said first plurality of outputs and a second digital signal established in response to said second plurality of outputs to provide first and second digital outputs representative of a first polarization state of said QAM optical signal at which data is modulated and a second polarization state of said QAM optical signal at which data is modulated,
  said equalization algorithm being characterized by a cost function that is a function of a Euclidian distance between detected symbols of said QAM optical signal in said first digital output of said equalizer, wherein said at least one cost function is:

$$J=E[(D^2-|R^2-|Re(u(n))|^2|)^2]+E[(D^2-|R^2|Im(u(n))|^2|)^2]$$

where J represents the cost function value E[.] denotes expectation, D is said Euclidian distance and is a minimum Euclidian distance between said symbols, $R^2$ is equal to ½ of the average symbol power in said first digital output of said equalizer, Re(u(n)) is a real portion of said first digital output of said equalizer for a current update cycle, and Im(u(n)) is an imaginary portion of said first digital output of said equalizer for said current update cycle.

10. An optical receiver system according to claim 9, wherein said Euclidean distance is a minimum Euclidian distance between said detected symbols.

11. An optical receiver system according to claim 9, wherein said DSP does not include a carrier phase estimation function for estimating a carrier phase of said QAM signal.

12. An optical receiver system according to claim 9, wherein said equalizer comprises at least one sub-equalizer filter, said at least one sub-equalizer filter comprising a plurality of delays for producing successively delayed versions of said first digital signal and a plurality of multipliers, each of said multipliers multiplying said first digital signal or an associated one of said delayed versions of said first digital signal with an associated filter coefficient to produce an associated tap weight product, said tap weight products being summed to provide said first digital output.

13. An optical receiver system according to claim 12, wherein said filter coefficients for said at least one sub-equalizer are calculated according to the following equation:

$$h_{xx}(n+1)=h_{xx}(n)+\mu\epsilon_{SMA}(u(n))u(n)x^*(n)$$

where n is said current update cycle, n+1 is a next update cycle, μ is a step size, x(n) is said first digital signal for said current update cycle, the superscript * means complex conjugation, and $\epsilon_{sma}(u(n))$ is calculated as:

$$\epsilon_{SMA}(u(n))=(D^2-|R^2-|Re(u(n))|^2|)+j(D^2-|R^2-|Im(u(n))|^2|).$$

14. A method of demodulating a quadrature amplitude modulated (QAM) optical signal using a digital signal processor (DSP) without a carrier phase estimation function for estimating a carrier phase of said QAM signal, said method comprising:

equalizing a signal representative of said (QAM) optical signal transmitted over an optical transmission path using an equalizer configured to apply equalization algorithm to said signal, said equalization algorithm being characterized by a cost function that is a function of a Euclidian distance between detected symbols of said QAM optical signal at an output of said equalizer, wherein said cost function is:

$$J=E[(D^2-|R^2-|Re(u(n))|^2|)^2]+E[(D^2-|R^2|Im(u(n))|^2|)^2]$$

where J represents the cost function value E[.] denotes expectation, D is said Euclidian distance and is a minimum Euclidian distance between said symbols, $R^2$ is equal to ½ of the average symbol power at said output of said equalizer, Re(u(n)) is a real portion of said output of said equalizer for a current update cycle, and Im(u(n)) is an imaginary portion of said output of said equalizer for said current update cycle.

15. A method according to claim 14, wherein QAM optical signal is a polarization multiplexed QAM optical signal.

16. A method according to claim 14, wherein said equalizer comprises at least one sub-equalizer filter, said at least one sub-equalizer filter comprising a plurality of delays for producing successively delayed versions of said signal and a plurality of multipliers, each of said multipliers multiplying said signal or an associated one of said delayed versions of said signal with an associated filter coefficient to produce an associated tap weight product, said tap weight products being summed to provide said output of said equalizer.

17. A method according to claim 16, wherein said filter coefficients for said at least one sub-equalizer are calculated according to the following equation:

$$h_{xx}(n+1)=h_{xx}(n)+\mu\epsilon_{SMA}(u(n))u(n)x^*(n)$$

where n is said current update cycle, n+1 is a next update cycle, μ is a step size, x(n) is said signal for said current update cycle, the superscript * means complex conjugation, and εsma(u(n)) is calculated as:

$$\epsilon_{SMA}(u(n))=(D^2-|R^2-|Re(u(n))|^2|)+j(D^2-|R^2-|Im(u(n))|^2|).$$

* * * * *